US012800368B2

(12) United States Patent
Konishi et al.

(10) Patent No.: US 12,800,368 B2
(45) Date of Patent: Nov. 17, 2026

(54) FLUID MEASUREMENT CHANNEL APPARATUS AND ULTRASONIC FLOW METER INCLUDING SAME

(71) Applicant: Panasonic Intellectual Property Management Co., Ltd., Osaka (JP)

(72) Inventors: Ryohei Konishi, Kyoto (JP); Asako Miyoshi, Kyoto (JP); Yuuji Nakabayashi, Nara (JP); Masato Satou, Nara (JP); Masataka Matsuda, Kyoto (JP); Yuya Takakura, Nara (JP); Motoyuki Nawa, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 224 days.

(21) Appl. No.: 18/863,442

(22) PCT Filed: May 15, 2023

(86) PCT No.: PCT/JP2023/018028
§ 371 (c)(1),
(2) Date: Nov. 6, 2024

(87) PCT Pub. No.: WO2023/223985
PCT Pub. Date: Nov. 23, 2023

(65) Prior Publication Data

US 2025/0314510 A1 Oct. 9, 2025

(30) Foreign Application Priority Data

May 16, 2022 (JP) ................................ 2022-079890

(51) Int. Cl.
*G01F 1/66* (2022.01)

(52) U.S. Cl.
CPC .................................. *G01F 1/662* (2013.01)

(58) Field of Classification Search
CPC ................................ G01F 15/14; G01F 1/662
See application file for complete search history.

(56) References Cited

U.S. PATENT DOCUMENTS

| | | | |
|---|---|---|---|
| 8,978,482 | B2 | 3/2015 | Ozaki et al. |
| 2013/0239699 | A1 | 9/2013 | Ozaki et al. |

(Continued)

FOREIGN PATENT DOCUMENTS

| | | |
|---|---|---|
| JP | 2003-270021 | 9/2003 |
| JP | 2004-170384 | 6/2004 |

(Continued)

OTHER PUBLICATIONS

International Search Report (ISR) issued Jul. 18, 2023 in International (PCT) Application No. PCT/JP2023/018028.

(Continued)

*Primary Examiner* — Francis C Gray
(74) *Attorney, Agent, or Firm* — Wenderoth, Lind & Ponack, L.L.P.

(57) ABSTRACT

A fluid measurement channel apparatus of the present disclosure includes: a channel main body including a channel through which a fluid to be measured flows and which has a rectangular section; a substantially rectangular partition plate located so as to divide a short side of the channel; and attaching portions by which the partition plate is attached to the channel main body and which are located at upstream and downstream sides. One of the attaching portions is a fixed attaching portion fixed to the channel. The other attaching portion is a movable attaching portion that is slidable relative to the channel main body in a longitudinal direction of the partition plate.

3 Claims, 4 Drawing Sheets

2 PARTITION PLATE
10 ATTACHING PORTION
10a FIXED ATTACHING PORTION
10b MOVABLE ATTACHING PORTION
20 ULTRASONIC FLOW METER

(56) References Cited

U.S. PATENT DOCUMENTS

| | | | | |
|---|---|---|---|---|
| 2014/0230568 | A1* | 8/2014 | Adachi | G01F 1/667<br>73/861.28 |
| 2016/0146650 | A1* | 5/2016 | Satou | G01F 1/662<br>73/861.25 |
| 2021/0270649 | A1* | 9/2021 | Takahashi | G01F 1/667 |

FOREIGN PATENT DOCUMENTS

| | | | | |
|---|---|---|---|---|
| JP | 2005-257363 | | | 9/2005 |
| JP | 2008-107234 | | | 5/2008 |
| JP | 2008107234 | A | * | 5/2008 |
| JP | 2010-127811 | | | 6/2010 |
| JP | 4893754 | B2 | * | 3/2012 |
| JP | 2012-103149 | | | 5/2012 |
| JP | 4986748 | | | 7/2012 |
| WO | 2010/061558 | | | 6/2010 |

OTHER PUBLICATIONS

Extended European Search Report issued Jul. 22, 2025 in corresponding European Patent Application No. 23807587.3.

* cited by examiner

2 PARTITION PLATE
10 ATTACHING PORTION
10a FIXED ATTACHING PORTION
10b MOVABLE ATTACHING PORTION
20 ULTRASONIC FLOW METER

1 CHANNEL
4 CHANNEL MAIN BODY PROJECTING PORTION
5 CHANNEL MAIN BODY RECESS PORTION
21 FLUID MEASUREMENT CHANNEL APPARATUS

FLUID MEASUREMENT CHANNEL APPARATUS AND ULTRASONIC FLOW METER INCLUDING SAME

TECHNICAL FIELD

The present disclosure relates to a fluid measurement channel apparatus including a plurality of flat channels.

BACKGROUND ART

PTL 1 discloses a channel apparatus in which a measurement channel is divided into flat channels. The channel apparatus includes: a partition plate that divides the channel into the flat channels; and a fixing protruding portion formed at the partition plate to fix the partition plate to the measurement channel.

CITATION LIST

Patent Literature

PTL 1: Japanese Laid-Open Patent Application Publication No. 2010-127811

SUMMARY OF INVENTION

Technical Problem

The present disclosure provides a fluid measurement channel apparatus that can prevent deformation of a partition plate, located in a measurement channel, by thermal expansion even when the temperature of a fluid to be measured changes.

Solution to Problem

A fluid measurement channel apparatus according to the present disclosure includes: a channel main body including a channel through which a fluid to be measured flows and which has a rectangular section; a substantially rectangular partition plate located so as to divide a short side of the channel to form divided channels; and attaching portions by which the partition plate is attached to the channel main body. The attaching portions are located at upstream and downstream sides of the partition plate. One of the attaching portions fixes the partition plate to the channel main body. The other attaching portion holds the partition plate so as to be slidable relative to the channel main body in a longitudinal direction of the partition plate.

Advantageous Effects of Invention

According to the fluid measurement channel apparatus of the present disclosure, one end of the partition plate in the channel is fixed, and the other end thereof is slidable. Thus, even when the temperature of the fluid to be measured changes, the deformation of the partition plate by the thermal expansion can be prevented. Therefore, the accuracy of the flow rate measurement can be maintained with respect to the temperature change of the fluid to be measured.

DESCRIPTION OF EMBODIMENTS

Findings, Etc., on which the Present Disclosure is Based

At the time when the present inventors have arrived at the present disclosure, when measuring the flow rate with a measurement channel apparatus in which a measurement channel having a rectangular section is divided into many layers by partition plates, a method of fixing the partition plates to the channel by projections formed on the partition plates was common as a method of fixing the partition plates.

However, the present inventors have found a problem that when the materials of the partition plate and the measurement channel are different from each other, and linear expansion coefficients of the partition plate and the measurement channel are different from each other, the partition plates deform by a temperature change. To solve this problem, the present inventors have made the subject matter of the present disclosure.

Thus, the present disclosure provides a fluid measurement channel apparatus that prevents the deformation of the partition plate by the temperature change of a fluid to be measured.

Hereinafter, embodiments will be described in detail with reference to the drawings. However, detailed explanations beyond necessity may be omitted. For example, detailed explanations of known matters and the same explanations regarding the substantially same components may be omitted.

The attached drawings and the following description are provided to help skilled persons fully understand the present disclosure and are not intended to limit the subject matters recited in the claims.

Embodiment 1

Hereinafter, Embodiment 1 will be described with reference to FIGS. 1 to 6.

1-1. Configuration

Figure 1:
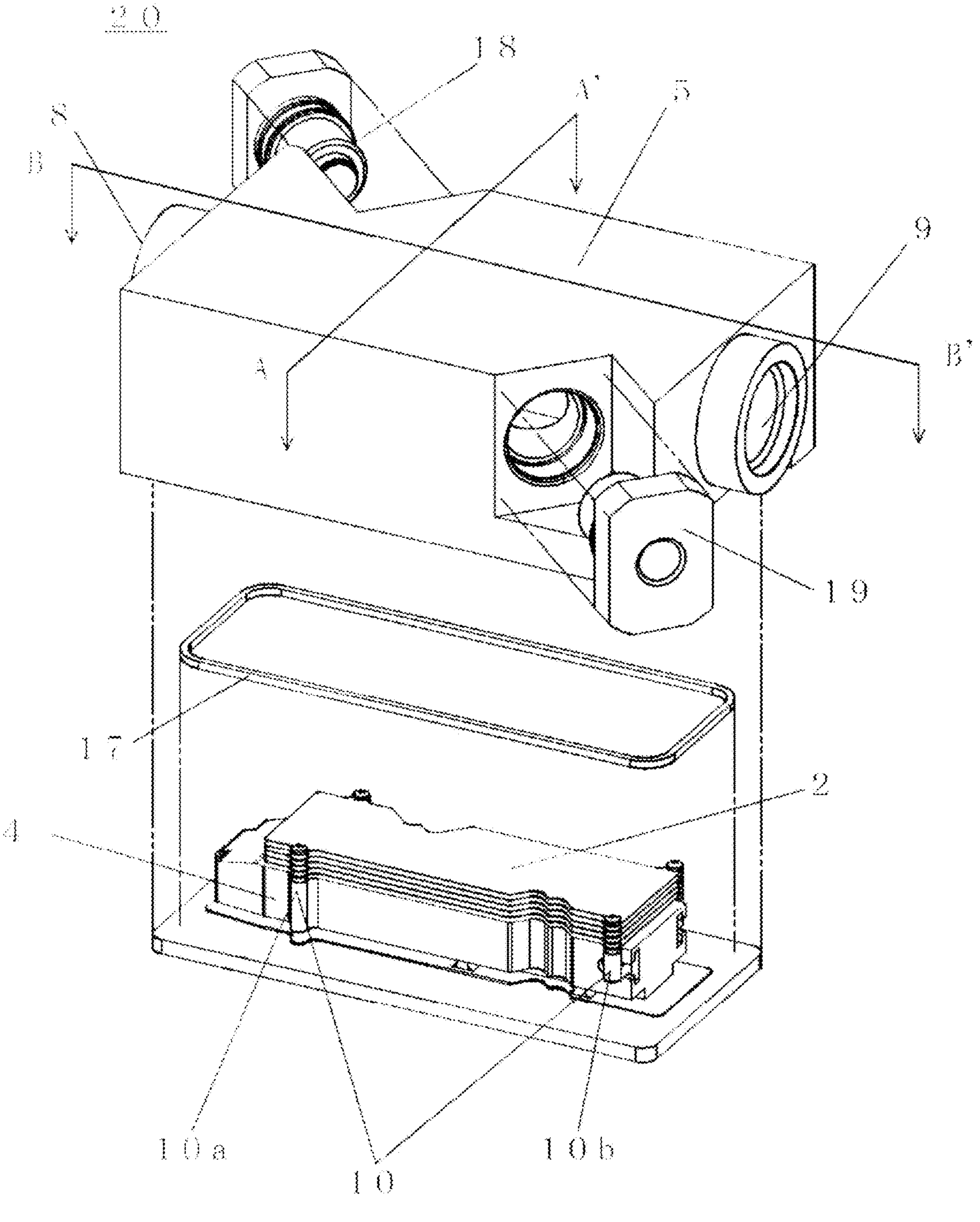
FIG. 1 is an exploded assembly diagram of an ultrasonic flow meter of Embodiment 1.
Figure 2:
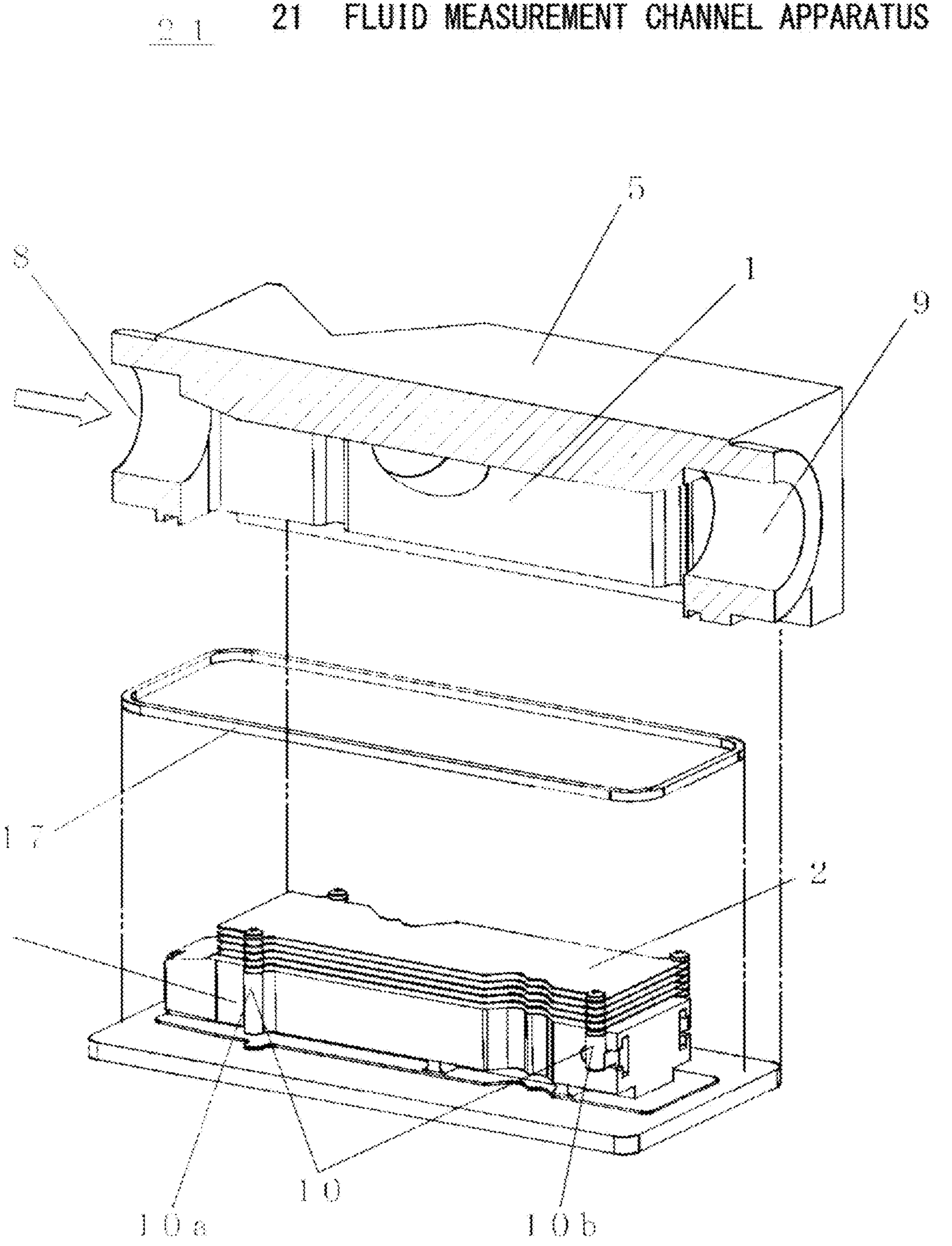
FIG. 2 is a partially sectional exploded assembly diagram of a fluid measurement channel apparatus of Embodiment 1.
Figure 3:
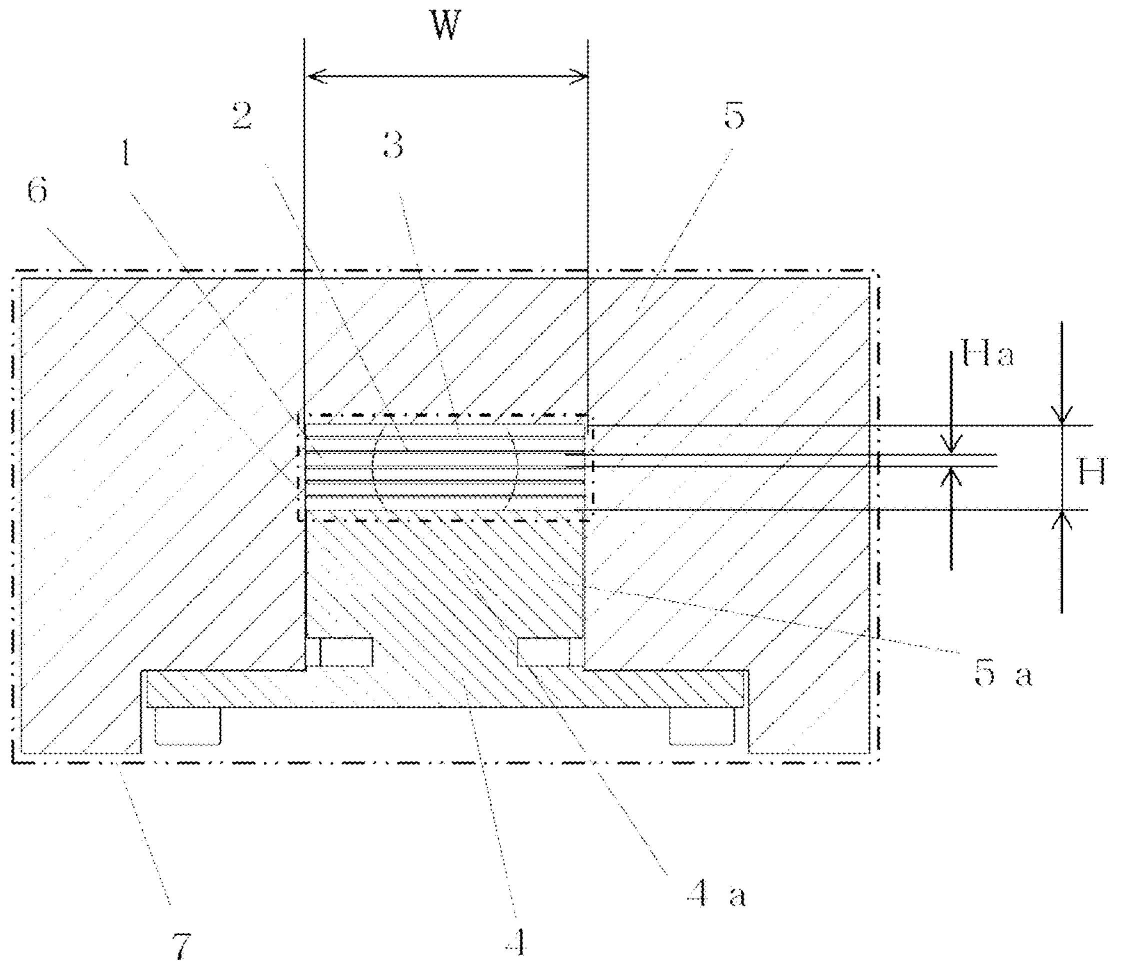
FIG. 3 is a channel cross-sectional view of the fluid measurement channel apparatus of Embodiment 1.
Figure 4:
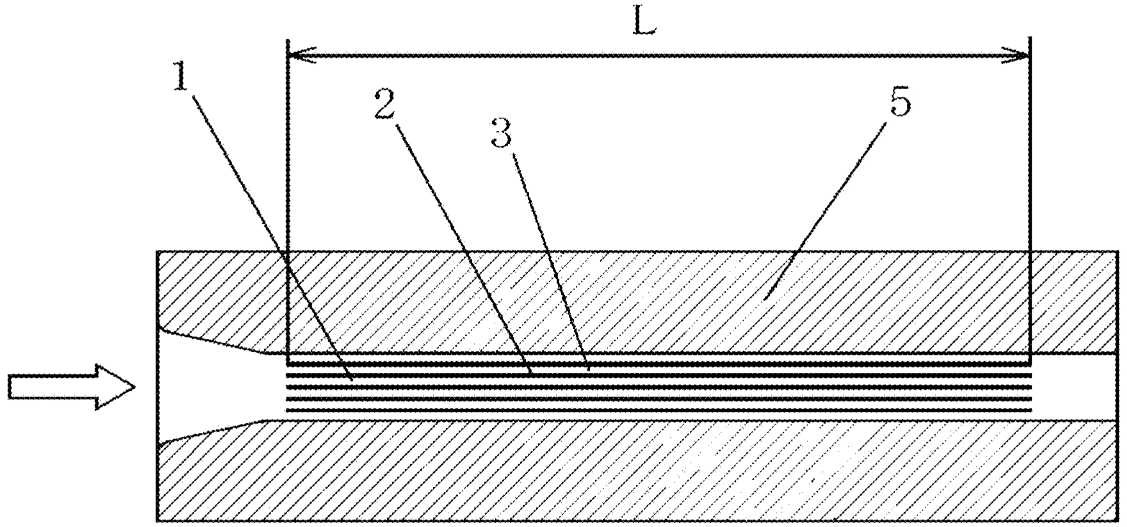
FIG. 4 is a schematic sectional view of the fluid measurement channel apparatus of Embodiment 1 in a channel longitudinal direction.

FIG. 1 is an exploded assembly diagram of an ultrasonic flow meter in Embodiment 1 of the present disclosure. FIG. 2 is a partially sectional exploded assembly diagram in which the exploded assembly diagram of the fluid measurement channel apparatus of FIG. 1 is partially shown as a sectional view. FIG. 3 is a channel cross-sectional view orthogonal to a flow direction of the channel in an assembled state and corresponds to a section taken along line A-A' of FIG. 1. FIG. 4 is a schematic sectional view along the flow direction of the channel in the assembled state and corresponds to a section taken along line B-B' of FIG. 1.

A section of a channel 1 which has a rectangular section and through which a fluid to be measured flows in a direction shown by a white arrow in FIG. 2 has a rectangular sectional shape which has a long-side width W and a short-side height H as shown in FIG. 3. In the channel 1, substantially rectangular partition plates 2 divide a short-side direction of the rectangular section to form a plurality of divided channels 3. A short-side height Ha after the division is smaller than the height H before the division. Since an aspect ratio (W/Ha) of the divided channel 3 is large, two-dimensional quality of the flow improves, and a flow velocity distribution is uniformized in a width direction of the channel 1. Moreover, by setting the short-side heights Ha to be equal, the uniformity among the divided channels improves, and straightening of the flow in the channel as a whole is achieved.

As shown in FIG. 3, the channel 1 corresponds to a space 6 (portion surrounded by a one-dot chain line) formed in such a manner that a projecting portion 4*a* of a channel main body projecting portion 4 is inserted into a recess portion 5*a* of a channel main body recess portion 5. A channel main body 7 (portion surrounded by a two-dot chain line) is constituted by the channel main body projecting portion 4 and the channel main body recess portion 5. As shown in a flow direction section of FIG. 4, the channel 1 is a channel having a length L in the flow direction. A direction along the length L is a longitudinal direction of the partition plate 2.

As shown in FIG. 1, the channel main body recess portion 5 includes: an inlet 8 located at an upstream side of the channel 1; and an outlet 9 located at a downstream side of the channel 1.

Figure 5:
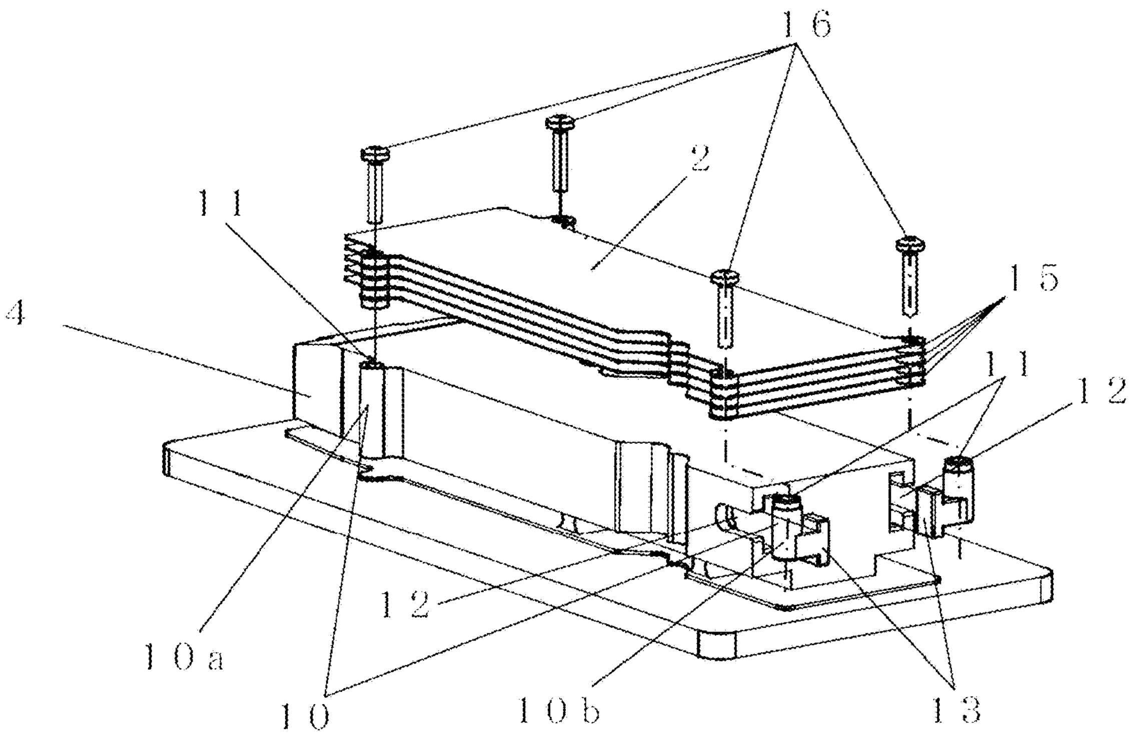
FIG. 5 is an assembly perspective view of a channel main body projecting portion of the fluid measurement channel apparatus of Embodiment 1.
Figure 6:
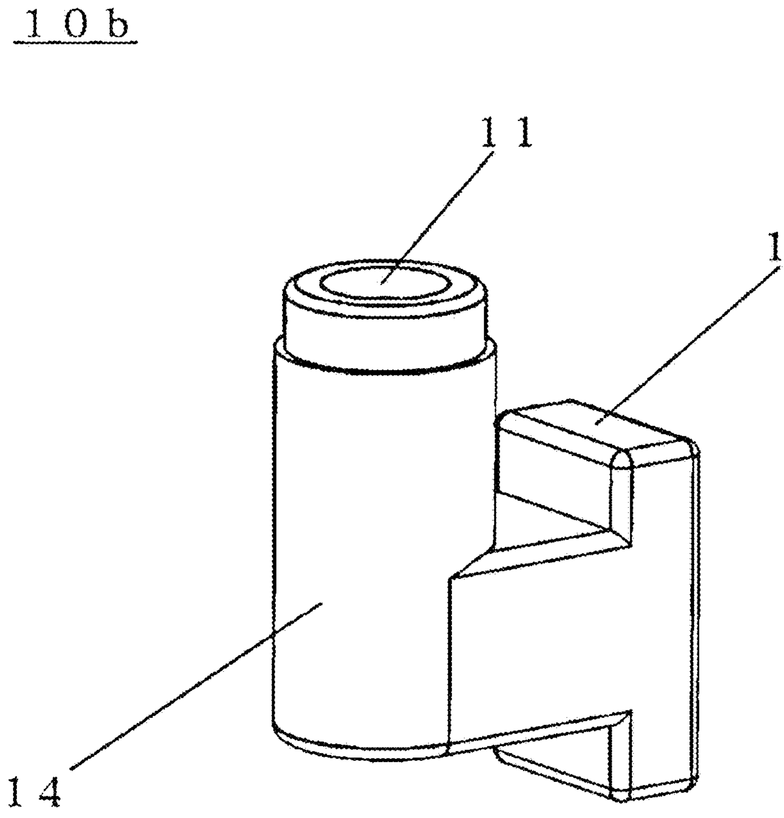
FIG. 6 is a perspective view of the appearance of a slide member of the fluid measurement channel apparatus of Embodiment 1.

FIG. 5 is an assembly perspective view of the channel main body projecting portion of the fluid measurement channel apparatus. FIG. 6 is a perspective view of the appearance of a slide member of the fluid measurement channel apparatus. A method of assembling the partition plates 2 and a method of attaching the assembled partition plates 2 to the channel main body projecting portion 4 will be described with reference to FIGS. 5 and 6.

As shown in FIG. 5, the channel main body projecting portion 4 includes attaching portions 10 which are located at the upstream and downstream sides and to which the partition plates 2 are attached. The attaching portions 10 at the upstream side are formed integrally with the channel main body projecting portion 4 as fixed attaching portions 10*a* each including a screw hole 11 by which the partition plates 2 are attached and fixed. Moreover, the attaching portions 10 at the downstream side serve as movable attaching portions 10*b* that are inserted into sliding grooves 12 of the channel main body projecting portion 4 and are held so as to be slidable in a longitudinal direction of the partition plate 2. The movable attaching portions 10*b* are separable as separate members.

As shown in FIG. 6, the movable attaching portion 10*b* includes: a leg portion 13; and a boss portion 14 including the screw hole 11. The leg portion 13 is inserted into the sliding groove 12 of the channel main body projecting portion 4 shown in FIG. 5 and is slidable in the longitudinal direction of the partition plate 2.

Moreover, as shown in FIG. 5, the partition plates 2 include through holes (not shown) at positions corresponding to the attaching portions 10. The partition plates 2 are assembled through spacers 15 in order such that an interval between the partition plates 2 becomes the short-side size Ha shown in FIG. 3. Then, the partition plates 2 are fixed to the screw holes 11 of the attaching portions 10 with screws 16.

As shown in FIG. 1, the channel main body projecting portion 4 to which the partition plates 2 have been attached is inserted into and assembled to the channel main body recess portion 5 through a gasket 17 that secures airtight sealing of the channel 1. Thus, a fluid measurement channel apparatus 21 is configured. Then, an ultrasonic transducer 18 is assembled to the channel main body recess portion 5 at an upstream side of the fluid measurement channel apparatus 21, and an ultrasonic transducer 19 is assembled to the channel main body recess portion 5 at a downstream side of the fluid measurement channel apparatus 21. Thus, an ultrasonic propagation path (not shown) between the ultrasonic transducers 18 and 19 is formed in the channel 1 including the divided channels 3 formed by the partition plates 2. Thus, an ultrasonic flow meter 20 is configured.

1-2. Operations

The operations and actions of the fluid measurement channel apparatus 21 configured as above will be described below.

As shown in FIG. 1, the flow rate measurement is performed by a known method using transmission and reception of ultrasonic waves between the ultrasonic transducers 18 and 19. At this time, the ultrasonic waves pass through the divided channels 3 defined by the partition plates 2 of FIG. 3.

Herein, when the temperature of the fluid to be measured changes, the partition plates 2 expand and contract by heat, and at the same time, the channel main body projecting portion 4 and the channel main body recess portion 5 which form the channel 1 also expand and contract. At this time, the expansion and the contraction in the longitudinal direction of the partition plate 2 shown in FIG. 4 are significant.

The following will discuss a case where: both of the channel main body projecting portion 4 and the channel main body recess portion 5 are made of a material M; and the partition plate 2 is made of a material N different from the material M. In this case, when the partition plates 2 are completely fixed to the channel main body projecting portion 4, the partition plates 2 deform by a difference between the linear expansion coefficients of the materials M and N. This deformation deteriorates the uniformity of the height Ha between the partition plates 2 in FIG. 3, and this changes the flow state of the fluid to be measured and the propagation state of the ultrasonic waves. Thus, the flow rate measurement accuracy is influenced.

However, in the present embodiment, as shown in FIG. 1, upstream portions of the partition plates 2 are fixed to the channel main body projecting portion 4 by the fixed attaching portions 10*a*, but downstream portions of the partition plates 2 are slidably attached to the channel main body projecting portion 4 by the movable attaching portions 10*b*. Therefore, the partition plates 2 can freely expand and contract in accordance with the sliding of the leg portions 13 in the longitudinal direction of the partition plates 2. Thus, the deformation of the partition plates 2 in the thickness direction can be suppressed or prevented. Therefore, the uniformity of the height Ha between the partition plates 2 in FIG. 3 is maintained, and the flow in the channel is straightened. Moreover, the flow state of the fluid to be measured and the propagation state of the ultrasonic waves do not change. Therefore, the flow rate measurement accuracy is maintained.

1-3. Effects, etc.

As above, the fluid measurement channel apparatus 21 of the present embodiment includes: the channel 1 through which the fluid to be measured flows and which has a rectangular section; and the substantially rectangular partition plates 2 which are located so as to divide a short side of the channel 1; and the attaching portions 10 by which the partition plates 2 are attached and which are located at the upstream and downstream sides. One of the attaching portions 10 is the fixed attaching portion 10*a* fixed to the channel 1, and another attaching portion 10 is the movable attaching portion 10*b* that is slidable relative to the channel 1 in the longitudinal direction of the partition plates 2.

As described above, one side portion of each partition plate 2 is fixed to the channel main body projecting portion 4 by the fixed attaching portion 10*a*, and the other side portion of each partition plate 2 is slidably attached to the channel main body projecting portion 4 by the movable attaching portion 10*b*. Therefore, when the partition plates 2 expand and contract by the temperature change of the fluid to be measured, the partition plates 2 can freely expand and contract, and therefore, the deformation of the partition plates 2 can be prevented.

Thus, even when the temperature change occurs, the uniformity of the height Ha between the partition plates 2 can be maintained, and therefore, the flow state of the fluid to be measured and the propagation state of the ultrasonic waves do not change. Therefore, the flow rate measurement accuracy can be maintained.

Moreover, since it is unnecessary to consider the difference between the linear expansion coefficients of the channel 1 and the partition plate 2, the degree of freedom of the materials of the channel 1 and the partition plate 2 improves.

Furthermore, according to the ultrasonic flow meter 20 including the fluid measurement channel apparatus 21, even when the temperature of the fluid to be measured or the temperature of an environment where the ultrasonic flow meter 20 is located changes at the time of the flow rate measurement, the measurement accuracy is guaranteed.

OTHER EMBODIMENTS

The foregoing has described Embodiment 1 as an example of the technology disclosed in the present application. However, the technology in the present disclosure is not limited to this and is applicable to embodiments in which modifications, replacements, additions, omissions, and the like have been made. Moreover, a new embodiment may be prepared by combining the components described in Embodiment 1.

The following will describe other embodiments.

In Embodiment 1, as one example, the attaching portion 10 at the upstream side is the fixed attaching portion 10*a*, and the attaching portion 10 at the downstream side is the movable attaching portion 10*b*. However, the attaching portion 10 at the upstream side may be the movable attaching portion 10*b*, and the attaching portion 10 at the downstream side may be the fixed attaching portion 10*a*.

Moreover, the attaching portions 10 are located at two places that are the upstream side and the downstream side. However, the attaching portions 10 may be located at three places that are the upstream side, an intermediate place, and the downstream side, the fixed attaching portion 10*a* may be located at the intermediate place, and the movable attaching portions 10*b* may be located at the upstream side and the downstream side.

Moreover, the number of partition plates 2 is plural but may be one.

The above embodiments are described to exemplify the technology of the present disclosure. Therefore, various modifications, replacements, additions, omissions, and the like may be made within the scope of the claims and their equivalents.

INDUSTRIAL APPLICABILITY

According to the present disclosure, even when the temperature of the fluid to be measured changes, the deformation of the partition plate in the measurement channel is prevented. Therefore, the measurement accuracy can be maintained. The present disclosure is applicable to fluid measurement channel apparatuses, and specifically to various flow meters, gas meters, and the like.

REFERENCE SIGNS LIST

1 channel
2 partition plate
3 divided channel
4 channel main body projecting portion
5 channel main body recess portion
6 space
7 channel main body
8 inlet
9 outlet
10 attaching portion
10*a* fixed attaching portion
10*b* movable attaching portion
11 screw hole
12 sliding groove
13 leg portion
14 boss portion
15 spacer
16 screw
17 gasket
18 ultrasonic transducer
19 ultrasonic transducer
20 ultrasonic flow meter
21 fluid measurement channel apparatus

The invention claimed is:

1. A fluid measurement channel apparatus comprising:

a channel main body including a channel through which a fluid to be measured flows and which has a rectangular section;

a substantially rectangular partition plate located so as to divide a short side of the channel to form divided channels; and attaching portions by which the partition plate is attached to the channel main body, wherein:

the attaching portions are located at upstream and downstream sides of the partition plate;

one of the attaching portions fixes the partition plate to the channel main body; and the other attaching portion holds the partition plate so as to be slidable relative to the channel main body in a longitudinal direction of the partition plate.

2. The fluid measurement channel apparatus according to claim 1, wherein the other attaching portion includes:

a boss portion including a screw hole by which the partition plate is attached; and a leg portion to which the boss portion is connected and which is inserted into a sliding groove located at the channel main body and is slidable in the longitudinal direction of the partition plate.

3. An ultrasonic flow meter comprising the fluid measurement channel apparatus according to claim 1.

* * * * *